US012801468B2

(12) United States Patent
Jung et al.

(10) Patent No.: US 12,801,468 B2
(45) Date of Patent: Nov. 17, 2026

(54) CLOUD-BASED API SERVICE PROVIDING SYSTEM AND METHOD

(71) Applicant: SAMSUNG SDS CO., LTD., Seoul (KR)

(72) Inventors: Young Il Jung, Seoul (KR); Young Hoon Ahn, Seoul (KR); Mok Young Jeong, Seoul (KR); Soon Hong Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 93 days.

(21) Appl. No.: 18/680,285

(22) Filed: May 31, 2024

(65) Prior Publication Data

US 2024/0403151 A1 Dec. 5, 2024

(30) Foreign Application Priority Data

May 31, 2023 (KR) ........................ 10-2023-0070090

(51) Int. Cl.
*G06F 9/54* (2006.01)
*H04L 9/40* (2022.01)

(52) U.S. Cl.
CPC .............. *G06F 9/547* (2013.01); *H04L 63/08* (2013.01)

(58) Field of Classification Search
CPC .......... G06F 9/547; G06F 21/31; G06F 21/44; G06F 9/541; G06F 9/45558;
(Continued)

(56) References Cited

U.S. PATENT DOCUMENTS 11,252,157 B1 2/2022 Khanna et al.
11,563,636 B1 1/2023 Kairali et al.
(Continued)

FOREIGN PATENT DOCUMENTS

CN 110502340 A * 11/2019 .......... G06F 9/5016
JP 6404529 B1 10/2018
(Continued)

OTHER PUBLICATIONS

Extended European search report issued on Aug. 12, 2024, in counterpart European Patent Application No. 24178426.3 (4 pages).
(Continued)

*Primary Examiner* — Meng Vang
(74) *Attorney, Agent, or Firm* — NSIP Law

(57) ABSTRACT

There is provided a cloud-based application programming interface (API) service providing system. The system may comprise a cloud management console issuing authentication information for a requested API among a plurality of APIs, an API manager receiving a call message for a specific API, which comprises authentication information, from a user's terminal, performing authentication using the authentication information in the call message, and requesting the execution of the specific API based on the authentication result and an API execution engine generating the result of executing the specific API in response to a request from the API manager, wherein the cloud management console is a module belonging to a control plane, and the call message is received by the API manager belonging to a data plane without via the control plane.

20 Claims, 13 Drawing Sheets

(58) Field of Classification Search

CPC .................. G06F 9/4881; G06F 9/546; G06F 2009/45587; G06F 2009/45591; H04L 63/08

USPC ........................................................... 726/6

See application file for complete search history.

(56) References Cited

U.S. PATENT DOCUMENTS

| | | | | |
|---|---|---|---|---|
| 11,604,684 | B1 | 3/2023 | Hinrichs et al. | |
| 2007/0294695 | A1* | 12/2007 | Jensen .................. | G06F 9/4843 718/102 |
| 2008/0098465 | A1* | 4/2008 | Ramakrishna .......... | G06F 21/10 726/5 |
| 2014/0026203 | A1* | 1/2014 | Ho ........................ | H04L 63/168 726/9 |
| 2014/0075517 | A1* | 3/2014 | Alrabady .............. | G06F 21/572 726/4 |
| 2019/0342454 | A1 | 11/2019 | Sugaya | |
| 2020/0145421 | A1* | 5/2020 | Tin ........................ | H04L 9/0866 |
| 2020/0257479 | A1* | 8/2020 | Kunimatsu ........... | G06F 3/1234 |
| 2021/0157692 | A1* | 5/2021 | MacCarthaigh .... | G06F 11/0757 |
| 2021/0406102 | A1* | 12/2021 | Seetharaman ........ | H04L 67/535 |
| 2023/0153147 | A1* | 5/2023 | Al-Maamari ....... | H04L 63/0272 718/102 |
| 2023/0410543 | A1* | 12/2023 | Chatzistamatiou ... | G06F 40/106 |
| 2024/0020143 | A1* | 1/2024 | Shtarbev ............. | G06F 21/1064 |

FOREIGN PATENT DOCUMENTS

| | | | |
|---|---|---|---|
| KR | 10-2171436 | B1 | 10/2020 |
| KR | 10-2341377 | B1 | 12/2021 |

OTHER PUBLICATIONS

Korean Office Action issued on Nov. 27, 2025, in counterpart Korean Patent Application No. 10-2023-0070090 (6 pages in Korean).

* cited by examiner

CLOUD-BASED API SERVICE PROVIDING SYSTEM AND METHOD

This application claims the benefit of Korean Patent Application No. 10-2023-0070090, filed on May 31, 2023, in the Korean Intellectual Property Office, the disclosure of which is incorporated herein in its entirety by reference.

BACKGROUND

1. Field

The present disclosure relates to a cloud-based application programming interface (API) service providing system and method.

2. Description of the Related Art

The popularization of cloud technology has led to the emergence of systems (or platforms) that provide cloud-based application programming interface (API) services. Such systems provide APIs for services that are difficult for general users to implement (e.g., services that are difficult to develop or require significant development costs) and generate significant profits through billing based on the number of API calls, etc.

However, in the above systems, a function of operating (or controlling/managing) a cloud-based service (e.g., authentication, authorization, metering/billing, etc.) and a function of processing an API call are generally implemented on one plane (e.g., the same network). In this case, as API call-related traffic (load) increases, response delays occur for all system functions, resulting in a reduction in service quality and user satisfaction.

SUMMARY

Aspects of the present disclosure provide a system which can provide a high-quality cloud-based application programming interface (API) service and a method performed by the system.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a cloud-based application programming interface (API) service providing system. The system may comprise a cloud management console issuing authentication information for a requested API among a plurality of APIs, an API manager receiving a call message for a specific API, which comprises authentication information, from a user's terminal, performing authentication using the authentication information in the call message, and requesting the execution of the specific API based on the authentication result and an API execution engine generating the result of executing the specific API in response to a request from the API manager, wherein the cloud management console is a module belonging to a control plane, and the call message is received by the API manager belonging to a data plane without via the control plane.

In some embodiments, the APIs may comprise APIs for artificial intelligence (AI)-based character recognition, AI-based text analysis, and AI-based image analysis functions.

In some embodiments, the specific API may be an API for a data analysis function, and the API execution engine may run on a graphic processing unit (GPU)-based worker node.

In some embodiments, the system may further comprise an API authentication module belonging to the control plane, wherein the API manager performs the authentication by interworking with the API authentication module.

In some embodiments, the system may comprise further comprising a user management module belonging to the control plane, wherein the API manager checks the user's authority to use the specific API by interworking with the user management module and requests the execution of the specific API based further on the checking result.

In some embodiments, the specific API may be an API for a data analysis function, and the API manager may download analysis data from a storage and transmits the analysis data to the API execution engine.

In some embodiments, the API manager may comprise an API authentication interworking module performing the authentication by interworking with the control plane, a job manager creating a job for the specific API based on the call message and inserting the job into a queue and an API execution request module retrieving the job from the queue and requesting the API execution engine to execute the specific API.

In some embodiments, the job manager may comprise a job management module creating a job for the specific API and issuing an ID of the job and a job status check module checking a processing status of the job using a polling method by using the ID of the In some embodiments, the job management module may receive the result of executing the specific API from the API execution request module, store the execution result in a database and updates the processing status of the job to a completed status, and the job status check module may obtain the execution result from the database if the processing status of the job is the completed status and sends the execution result to the user's terminal.

In some embodiments, the API manager may comprise an API authentication interworking module performing the authentication by interworking with the control plane, a job manager creating a job for the specific API based on the call message and an API execution request module separating the job into tasks based on a preset criterion and requesting the API execution engine to execute the specific API on a task-by-task basis.

In some embodiments, the specific API may be an API for a data analysis function, and the API execution request module may verify the job based on at least one of a size, extension and filename of an analysis data file and processes the job by separating the job into tasks if the job is valid.

In some embodiments, the specific API may be an API for a data analysis function, and the API execution request module may separate the job into the tasks based on the number of files or pages of analysis data.

In some embodiments, the API manager may comprise an API authentication interworking module performing the authentication by interworking with the control plane, a job manager creating a job for the specific API based on the call message and an API execution request module requesting the API execution engine to execute the specific API in order to process the job, wherein if the specific API is an asynchronous API, the job manager sends an ID of the job to the user's terminal before the job is processed.

In some embodiments, the job manager may receive the result of executing the specific API from the API execution request module and uploads the execution result to storage accessible by the user's terminal.

In some embodiments, the API authentication interworking module may receive a query request comprising the ID of the job and the authentication information for the specific API, authenticates a requestor using the authentication information in the query request and provides a query result for the ID of the job to the requestor if the requestor is authenticated, and the query result comprises processing status information of the job or the result of executing the specific API.

In some embodiments, the cloud management console may comprise a demo management console which provides, on a trial basis, the result of executing an API selected by a specific user from the APIs, the demo management console obtains the result of executing the selected API by requesting the API manager for the result of executing, and the API manager is configured not to require authentication information for an API requested by the demo management console.

According to another aspect of the present disclosure, there is provided a cloud-based API service providing method performed by at least one computing device. The method may comprise receiving a call message for a specific API from a user's terminal without via a control plane to which a cloud management console belongs, performing authentication of the user using authentication information in the call message, obtaining the result of executing the specific API through an API execution engine if the authentication is successfully performed and providing the execution result to the user's terminal, wherein the call message comprises the authentication information, the authentication information is issued by the cloud management console, and the authentication is performed in conjunction with an API authentication module belonging to the control plane.

In some embodiments, the cloud management console may issue authentication information for a plurality of APIs comprising the specific API, and the APIs comprise APIs for AI-based character recognition, AI-based text analysis and AI-based image analysis functions.

In some embodiments, the specific API may be an API for a data analysis function, and the API execution engine runs on a GPU-based worker node.

According to another aspect of the present disclosure, there is provided a computer program coupled to a computing device and stored in a computer-readable recording medium to execute: receiving a call message for a specific API from a user's terminal without via a control plane to which a cloud management console belongs, performing authentication of the user using authentication information in the call message, obtaining the result of executing the specific API through an API execution engine if the authentication is successfully performed and providing the execution result to the user's terminal, wherein the call message comprises the authentication information, the authentication information is issued by the cloud management console, and the authentication is performed in conjunction with an API authentication module belonging to the control plane.

According to embodiments of the present disclosure, a function of operating (or controlling/managing) a cloud-based service (e.g., authentication, authorization, metering/billing, etc.) and a function of processing an API call may be implemented on different planes. In this case, even if service operation-related traffic (load) or API call-related traffic (load) increases, there is no response delay for all functions of a system, and as a result, service quality and user satisfaction can be improved. Furthermore, the problem of response delay to API calls can be easily solved by increasing the resources of a data plane responsible for processing API calls.

In addition, since various APIs for AI-based data analysis functions (e.g., character recognition, text analysis, image analysis, etc.), which are difficult for general users to develop, are integrated and provided, user satisfaction with API services can be further improved.

In addition, since a demo service is provided for various APIs, a user's authority to select an API service can be guaranteed, and thus user satisfaction can be further improved.

However, the effects of the present disclosure are not restricted to the one set forth herein. The above and other effects of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
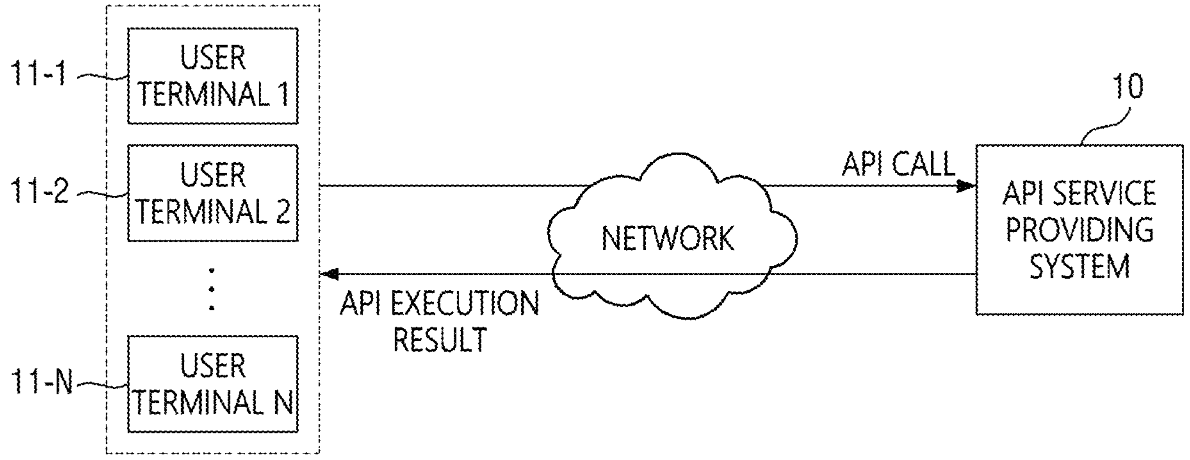
FIG. 1 is an example configuration diagram schematically illustrating a cloud-based application programming interface (API) service providing system and its operating environment according to embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is an example configuration diagram schematically illustrating a cloud-based application programming interface (API) service providing system 10 and its operating environment according to embodiments of the present disclosure. In FIG. 1 and subsequent drawings, the cloud-based API service providing system 10 is illustrated as 'API service providing system'.

As illustrated in FIG. 1, the cloud-based API service providing system 10 may be a cloud-based computing system (or platform) and may provide API services to a plurality of user terminals 11-1 through 11-N. For example, the cloud-based API service providing system 10 may comprehensively provide users with APIs for various artificial intelligence (AI)-based data analysis functions that are difficult for the users to develop. Examples of such functions may include character recognition, text analysis, image analysis, translation, and speech-to-text (STT), but the scope of the present disclosure is not limited thereto. In some cases, the cloud-based API service providing system 10 may also provide users with APIs for data analysis functions (or other functions, e.g., functions that require a lot of computing resources) that are not based on AI. The detailed configuration and operation of the cloud-based API service providing system 10 will be described in detail with reference to FIG. 2 and subsequent drawings.

For case of description, the cloud-based API service providing system 10 will hereinafter be shortened to 'service providing system'. In addition, reference number '11' will be used when referring to any user terminal (e.g., 11-1, 11-2) or collectively referring to all user terminals (11-1 through 11-N).

The service providing system 10 described above may be implemented in at least one computing device. For example, a first function of the service providing system 10 may be implemented in a first computing device, and a second function may be implemented in a second computing device. Alternatively, a certain function of the service providing system 10 may be implemented in a plurality of computing devices.

Figure 14:
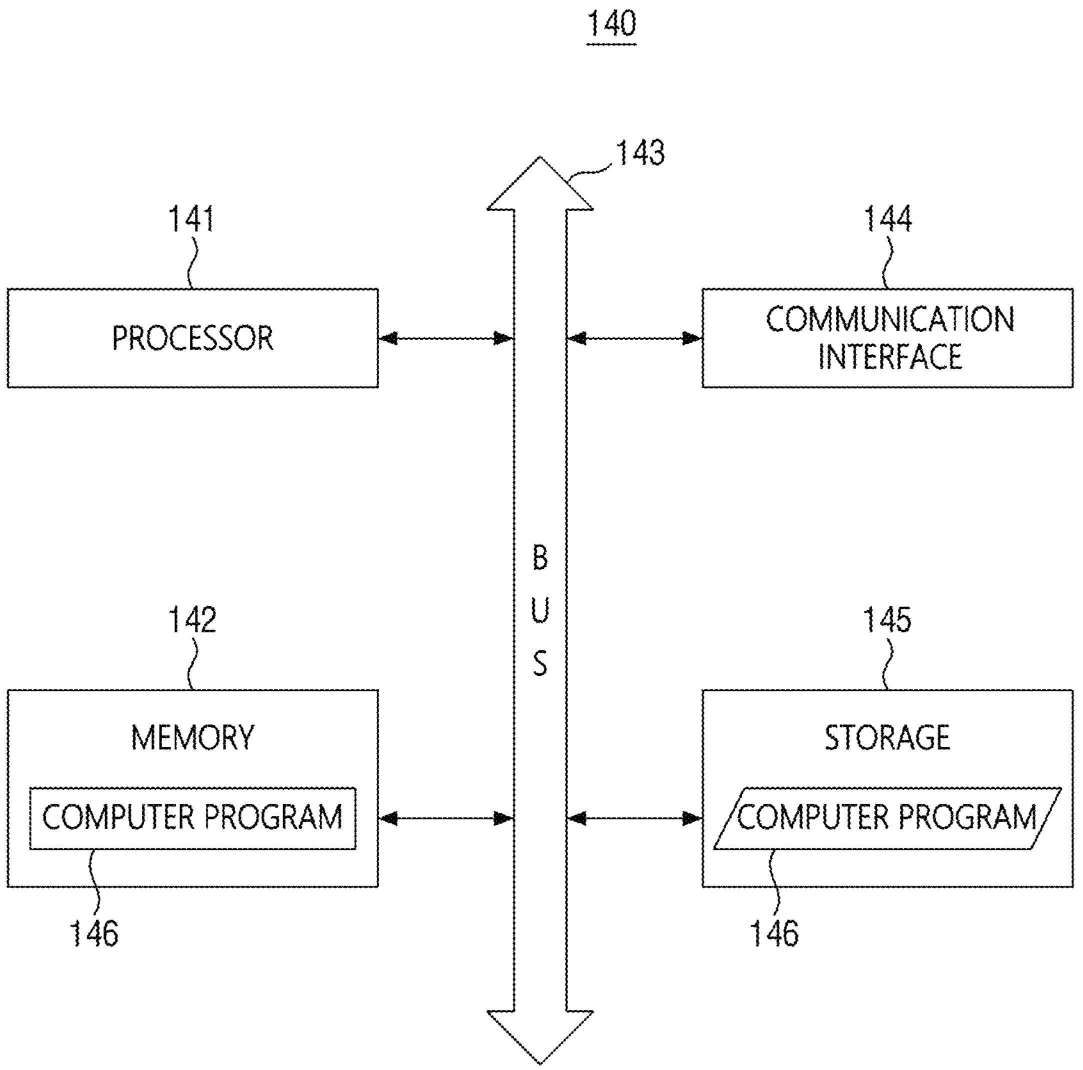
FIG. 14 illustrates an example computing device that can implement the cloud-based API service providing system according to the embodiments of the present disclosure.

A computing device may be any device having a computing function, and an example of this device is illustrated in FIG. 14. Since the computing device is a collection of various components (e.g., a memory, a processor, etc.) interacting with each other, it may also be referred to as a 'computing system' in some cases. In addition, the term 'computing system' may encompass the concept that it is a collection of a plurality of computing devices interacting with each other.

A user terminal 11 may refer to a user's terminal that uses an API service of the service providing system 10. The user terminal 11 can be implemented as any device. The user may be, for example, a developer or an administrator (e.g., a development manager who applies for an API service and sets developers' authority for API use), but the scope of the present disclosure is not limited thereto.

As illustrated in FIG. 1, the user terminal 11 and the service providing system 10 may communicate through a network. Here, the network can be implemented as all types of wired/wireless networks such as a local area network (LAN), a wide area network (WAN), a mobile radio communication network, and wireless broadband Internet (Wibro).

So far, the service providing system 10 and its operating environment according to the embodiments of the present disclosure have been roughly described with reference to FIG. 1. Hereinafter, the functional separation structure, detailed configuration, and operation of the service providing system 10 will be described in more detail with reference to FIGS. 2 through 4.

Figure 2:
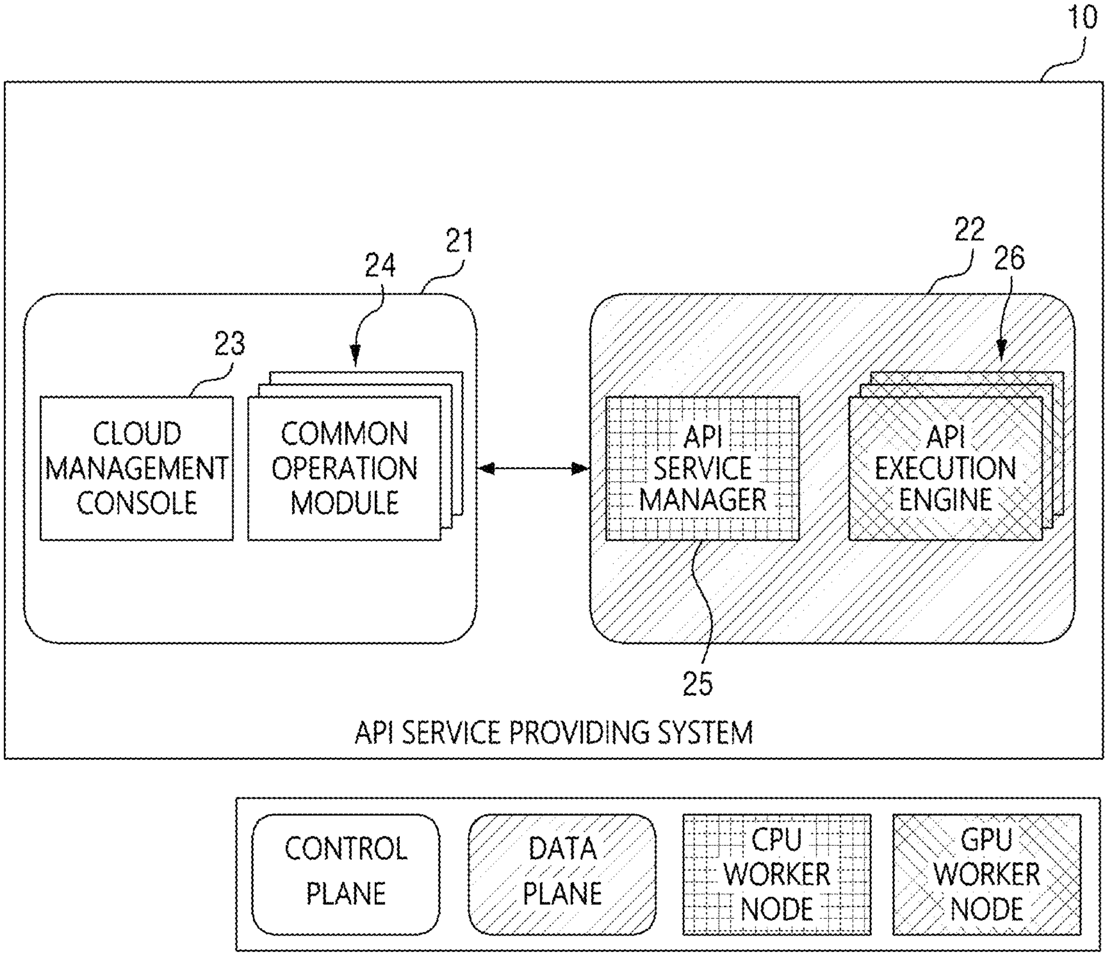
FIG. 2 is an example block diagram illustrating the functional separation structure of the cloud-based API service providing system according to the embodiments of the present disclosure.

FIG. 2 is an example diagram illustrating the functional separation structure of the service providing system 10 according to the embodiments of the present disclosure.

As illustrated in FIG. 2, functions of the service providing system 10 may be implemented separately on a control plane 21 and a data plane 22. In this case, even if service operation-related traffic (i.e., control traffic) or API call-related traffic (i.e., data traffic) increases, no response delay occurs for all functions of the service providing system 10. In addition, the problem of response delay due to increased API call-related traffic (load) can be easily solved by increasing the resources (e.g., computing resources, network bandwidth, etc.) of the data plane 22.

Specifically, the service providing system 10 may be configured to include a cloud management console 23, a common operation module 24, an API service manager 25, and an API execution engine 26. Here, the cloud management console 23 and the common operation module 24 are modules responsible for operating (or controlling/managing) a cloud-based API service, and the API service manager 25 and the API execution engine 26 are modules responsible for processing API calls. Therefore, the cloud management console 23 and the common operation module 24 may be implemented to belong to the control plane 21, and the API service manager 25 and the API execution engine 26 may be implemented to belong to the data plane 22. For example, the cloud management console 23 and the common operation module 24 may be implemented on a first network, and the API service manager 25 and the API execution engine 26 may be implemented on a second network (e.g., a network with a larger bandwidth than the first network) different from the first network. Accordingly, traffic of different characteristics may be naturally separated into different planes (or networks). As a result, the overall response speed of the service providing system 10 can be greatly improved.

As illustrated, the API service manager 25 belonging to the data plane 22 may run on a central processing unit (CPU) worker node, and the API execution engine 26 may run on a graphic processing unit (GPU) worker node. For example, if the API execution engine 26 is an engine that executes an API for an AI-based data analysis function (e.g., character recognition, text analysis, image analysis, etc.), the API execution engine 26 may run on the GPU worker node. Accordingly, the response speed for API calls can be greatly improved. The worker nodes may be either virtual machines or physical machines.

In some embodiments, an auto-scaling function may be performed based on the resource usage (or the amount of API call-related traffic (load)) of worker nodes (e.g., CPU worker nodes or GPU worker nodes). For example, if the resource usage of GPU worker nodes on which the API execution engine 26 runs is equal to or greater than a reference value, the service providing system 10 may increase the number of GPU worker nodes (scale-out), and in the opposite case, may reduce the number of GPU worker nodes (scale-in).

For reference, the common operation module 24 may be a generic term for various modules required for the operation of a cloud-based API service, and the API execution engine 26 may be a generic term for engines required for the execution of various APIs.

Figure 3:
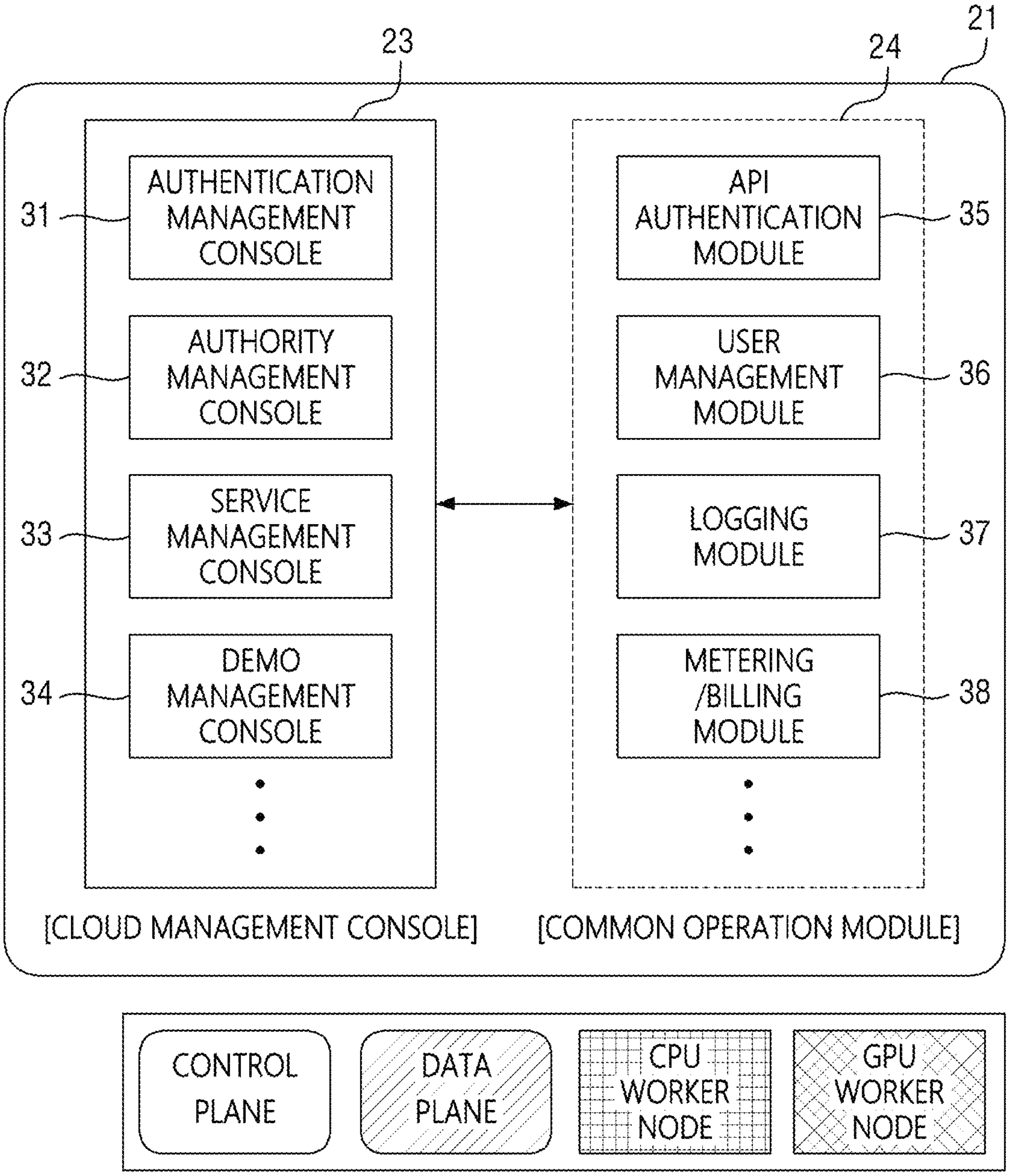
FIGS. 3 and 4 are example block diagrams illustrating, in more detail, the configuration and operation of the cloud-based API service providing system according to the embodiments of the present disclosure.
Figure 4:
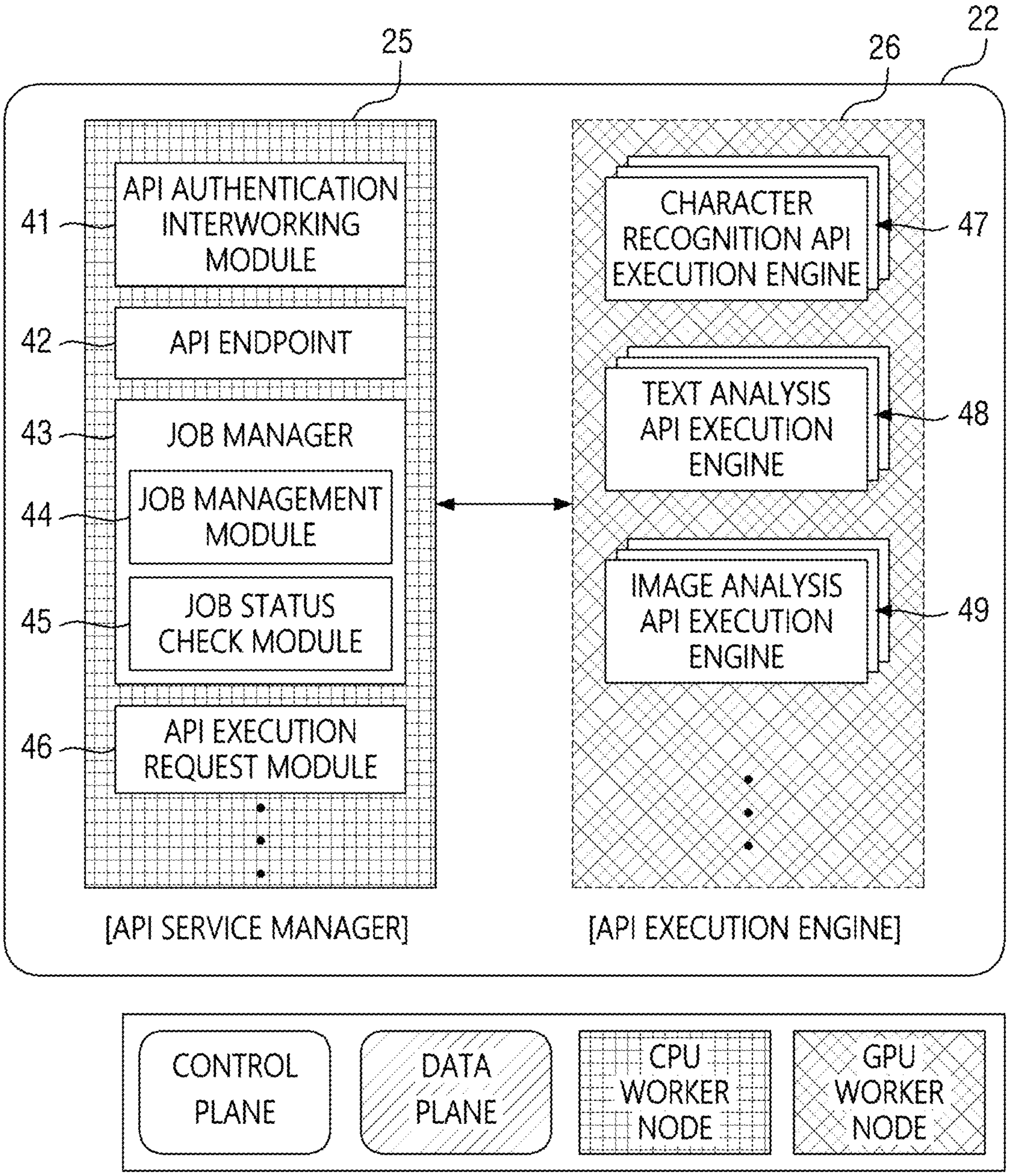

The detailed configuration and operation of the service providing system 10 will now be described in more detail with reference to FIGS. 3 and 4. FIG. 3 is a block diagram illustrating, in more detail, modules (i.e., components) of the service providing system 10 which belong to the control plane 21. FIG. 4 is a block diagram illustrating, in more detail, modules (i.e., components) of the service providing system 10 which belong to the data plane 22.

As illustrated in FIG. 3, the cloud management console 23 may be configured to include an authentication management console 31, an authority management console 32, a service management console 33, and a demo management console 34. In some cases, the cloud management console 23 may further include other management modules.

The authentication management console 31 may refer to a module responsible for an authentication management function. For example, the authentication management console 31 may provide (issue) authentication information for an API call at a user's request. The authentication information may be, for example, an authentication key, token, etc., but the scope of the present disclosure is not limited thereto. The description will be continued below based on the assumption that the authentication management console 31 issues an 'authentication key'.

Next, the authority management console 32 may refer to a module responsible for an authority management function. For example, the authority management console 32 may provide a function of setting a user's authority for API use, the number of calls, usage time, etc. For example, an administrator (i.e., a development manager) may set policies such as developers' authority for API use, the number of uses, usage time, etc. through the authority management console 32.

Next, the service management console 33 may refer to a module responsible for a service management function. For example, the service management console 33 may provide a function of applying for an API service to a user. For example, the administrator (i.e., the development manager) may apply for APIs to be used by developers through the service management console 33. In some cases, a system administrator may create and provide an API product consisting of multiple APIs through the service management console 33 (e.g., various APIs related to each other are bundled together and provided as one API product).

Next, the demo management console 34 may refer to a module responsible for a demo management function. For example, the demo management console 34 may provide a demo service for an API selected by a user (i.e., a service that provides the result of executing a selected API on a trial basis). The demo service providing process will be described later with reference to FIG. 13. In some cases, the system administrator may select and set an API for demo from a plurality of APIs through the demo management console 34.

For reference, the cloud management console 23 described above may be a front-end module that provides an interface with a user (e.g., a developer or a development manager) or a system administrator and may be implemented through, for example, a web server (i.e., a management function is provided through a web interface). However, the scope of the present disclosure is not limited thereto.

The common operation module 24 will now be described.

As illustrated, an API authentication module 35, a user management module 35, a logging module 37, and a metering/billing module 38 may be included in the category of the common operation module 24. However, the scope of the present disclosure is not limited thereto, and various modules necessary for the operation of a cloud-based API service may be further included in the category of the common operation module 24.

The API authentication module 35 may refer to a module responsible for authenticating a called API. For example, the API authentication module 35 may identify (authenticate) a user of a called API using an authentication key included in an API call message. However, the scope of the present disclosure is not limited thereto.

Next, the user management module 35 may refer to a module responsible for integrated management of user information. For example, the user management module 35 may manage a user's account authentication information (e.g., ID, password, etc.), requested API (or API product) information, authority information, project information, etc. In addition, the user management module 35 may perform user account authentication, authority checking, etc. (i.e., perform an identity access management (IAM) function) based on the exemplified information. However, the scope of the present disclosure is not limited thereto.

Next, the logging module 37 may refer to a module responsible for a logging function. The logging module 37 may log various operations of the service providing system 10. For example, the logging module 37 may log API call information for which API (user) authentication and user authority checking have been successfully completed. Log information thus created can be used by the metering/billing module 38 to calculate service costs.

Next, the metering/billing module 38 may refer to a module responsible for metering and billing for a called API. For example, the metering/billing module 38 may measure the number of API calls by user, project, etc. (e.g., based on the log information) and calculate a service cost (e.g., by user, project, etc.) based on the number of API calls. However, the scope of the present disclosure is not limited thereto, and any metering and billing method can be used.

For reference, the common operation module 24 described above may be a back-end module that provides a common operation function of a cloud-based API service by interworking with the cloud management console 23 and/or the API service manager 25 and may be implemented through, for example, a web application server. However, the scope of the present disclosure is not limited thereto.

Modules belonging to the data plane 22 will now be described with reference to FIG. 4.

As illustrated in FIG. 4, the API service manager 25 belonging to the data plane 22 may be configured to include an API authentication interworking module 41, an API endpoint 42, a job manager 43, and an API execution request module 46.

The API authentication interworking module 41 may refer to a module responsible for authenticating a called API and interworking with the control plane 21. For example, the API authentication interworking module 41 may receive an API call message from a user terminal 11 and perform authentication (i.e., user authentication) for a called API using an authentication key in the API call message. At this time, the API authentication interworking module 41 may perform the authentication by interworking with the API authentication module 35 of the control plane 21. In addition, the API authentication interworking module 41 may check a user's authority by interworking with the user management module 36 of the control plane 21. The API call message for which user authentication and authority checking have been successfully completed may be sent to the API endpoint 42.

Next, the API endpoint 42 may refer to an endpoint that receives an API call message. The API endpoint 42 may initiate a response generation process for the API call message (i.e., a process that generates the result of executing a called API) by requesting the job manager 43 to create a job. This may be understood from the description of FIG. 6 and subsequent drawings. Since the meaning of the API endpoint will be already familiar to those of ordinary skill in the art, a description thereof will be omitted.

Next, the job manager 43 may refer to a module responsible for a job management function. Here, a job may refer to a work unit for processing an API call in the service providing system 10. For example, the job manager 43 may be responsible for functions such as job creation, job ID issuance, and job status check.

As illustrated, in some embodiments, the job manager 43 may be configured to include a job management module 45 and a job status check module 44. The job management module 45 may create a job and issue a job ID, and the job status check module 44 may check the status of the job using a polling method. Detailed operations of the job management module 45 and the job status check module 44 may be further understood from the description of FIG. 6 and subsequent drawings.

Next, the API execution request module 46 may refer to a module responsible for requesting the execution of a called API. For example, the API execution request module 46 may request the API execution engine 26 to execute an API of a job in order to process the job. In some cases, the API execution request module 46 may separate the job into tasks and request the execution of the API on a task-by-task basis. This may be further understood from the description of FIG. 6 and subsequent drawings.

Next, the API execution engine 26 may refer to a module that generates the result of executing a called API. As illustrated in FIG. 4, when the service providing system 10 provides APIs for AI-based character recognition, text analysis and image analysis, a character recognition API execution engine 47, a text analysis API execution engine 48, and an image analysis API execution engine 49 may be included in the category of the API execution engine 26. However, the scope of the present disclosure is not limited thereto. The description will be continued below based on the assumption that the service providing system 10 provides the exemplified APIs (i.e., AI-based data analysis APIs).

For reference, the components of the service providing system 10 illustrated in FIGS. 2 through 4 are functionally distinct functional elements. A plurality of components may be integrated with each other in an actual physical environment, or a specific functional element may be separated into a plurality of sub-functional elements.

So far, the functional separation structure, detailed configuration, and operation of the service providing system 10 have been described in detail with reference to FIGS. 2 through 4. Hereinafter, a method by which the service providing system 10 provides an API service will be described in more detail with reference to FIGS. 5 through 13.

Figure 5:
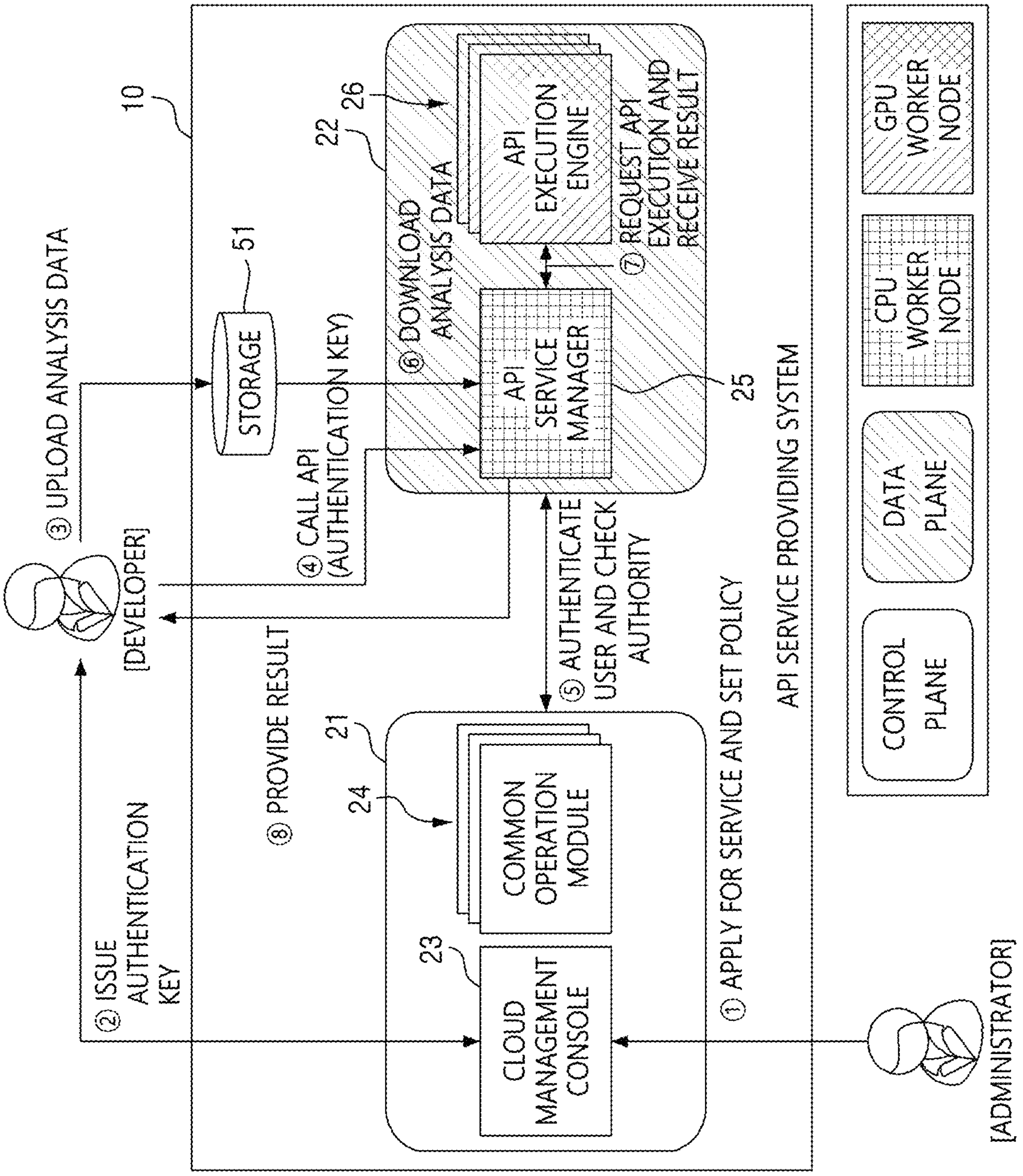
FIG. 5 illustrates the overall flow of an API service providing method performed by the cloud-based API service providing system according to the embodiments of the present disclosure.

FIG. 5 illustrates the overall flow of an API service providing method performed by the service providing system 10 according to the embodiments of the present disclosure. FIG. 5 assumes that an administrator (i.e., a development manager) applies for an API service and a developer calls an API. However, in some cases, the administrator and the developer may be the same user.

As illustrated in FIG. 5, the cloud management console 23 may receive an application for an API service from the administrator (i.e., the administrator's terminal) and receive set polices for using the API service (see ①). For example, the administrator may apply for an API, API product, etc. to be used by the developer through the service management console 33. In addition, the administrator may set policies such as the developer's (or project's) authority to use the requested API (or API product), the number of uses (i.e., the number of calls possible), usage time, etc. through the authority management console 32.

Next, the cloud management console 23 may issue an authentication key of an API in response to a request from the developer (i.e., the developer's terminal) (see ②).

Next, the developer may upload analysis data (e.g., analysis file) to accessible storage 51 (e.g., object-based storage (OBS)) (see ③). For reference, FIG. 5 assumes that the API service manager 25 obtains the analysis data through the storage 51, but the scope of the present disclosure is not limited thereto. For example, the API service manager 25 may also receive the analysis data directly from the developer or obtain the analysis data in other ways.

Next, the API service manager 25 may receive an API call message containing an authentication key from the developer (see ④). Then, the API service manager 25 may perform user authentication and authority checking by interworking with the common operation module 24 of the control plane 21 (see ⑤). Once this process is successfully completed, subsequent operations can be performed.

Next, the API service manager 25 may download the analysis data from the storage 51 and execute a called API through the API execution engine 26 (see ⑥ and ⑦). In addition, the API service manager 25 may provide the result of executing the called API to the developer (see ⑧).

Detailed processes of the API service providing method will now be described in more detail with reference to FIG. 6 and subsequent drawings. In drawings such as FIG. 6, the developer and the administrator are collectively referred to as a 'user' without distinction.

Figure 6:
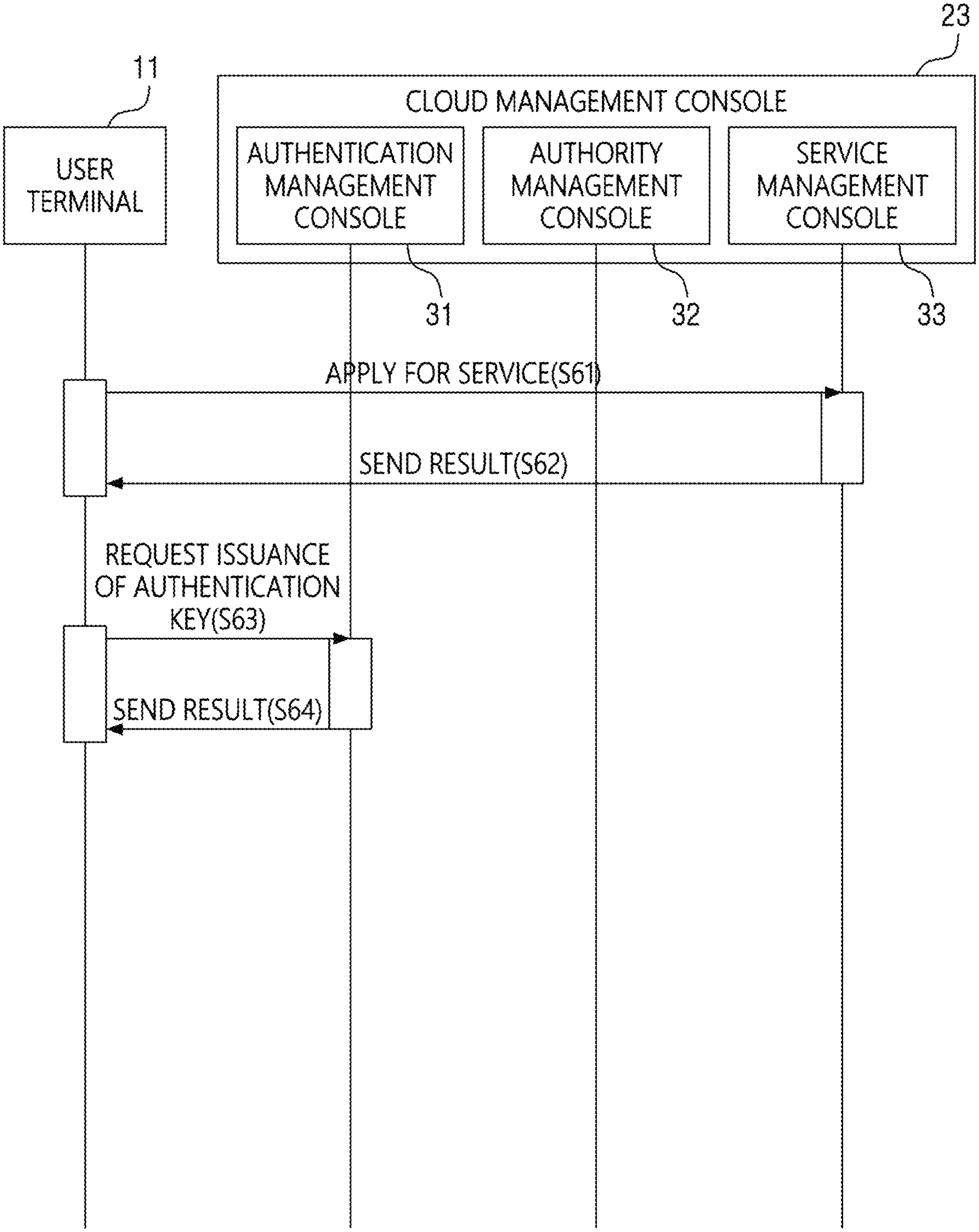
FIG. 6 is an example flowchart illustrating a service application processing process in the cloud-based API service providing system according to the embodiments of the present disclosure.

FIG. 6 is an example flowchart illustrating a service application process in the service providing system 10 according to the embodiments of the present disclosure. However, this is only an exemplary embodiment for achieving the objectives of the present disclosure, and some operations can be added or deleted as needed.

As illustrated in FIG. 6, the service application process may start with operation S61 in which the cloud management console 23 receives an application for an API service from a user terminal 11. For example, an administrator may access the service management console 33 through his or her terminal 11 and apply for an API, API product, etc. to be used. As described above, the administrator may set policies such as a developer's (or project's) authority to use the requested API (or API product), the number of uses, usage time, etc. through the authority management console 32. This setting (policy) information may be sent to the user management module 36 and used for authority checking.

In operation S62, the service management console 33 may send (transmit) the result of the application (e.g., success, failure, application details, etc.) for the API service to the user terminal 11.

In operation S63, the authentication management console 31 may receive a request (i.e., a request message) to issue an authentication key for a specific API from the user terminal 11. For example, the developer may access the authentication management console 31 through his or her terminal 11 and request the issuance of an authentication key for a specific API among requested APIs.

In operation S64, the authentication management console 31 may send (transmit) the result of issuing the authentication key (e.g., success, failure, authentication key, etc.) to the user terminal 11. The authentication management console 31 may issue an authentication key for a specific API through the API authentication module 35 or may issue an authentication key independently. In any case, an authentication key and user information may be sent to the API authentication module 35 and used to authenticate a called API.

So far, the service application process according to the embodiments of the present disclosure has been described with reference to FIG. 6. Hereinafter, an API call processing process in the service providing system 10 will be described in detail with reference to FIGS. 7 through 12.

First, a synchronous API call processing process will be described with reference to FIGS. 7 through 9.

Figure 7:
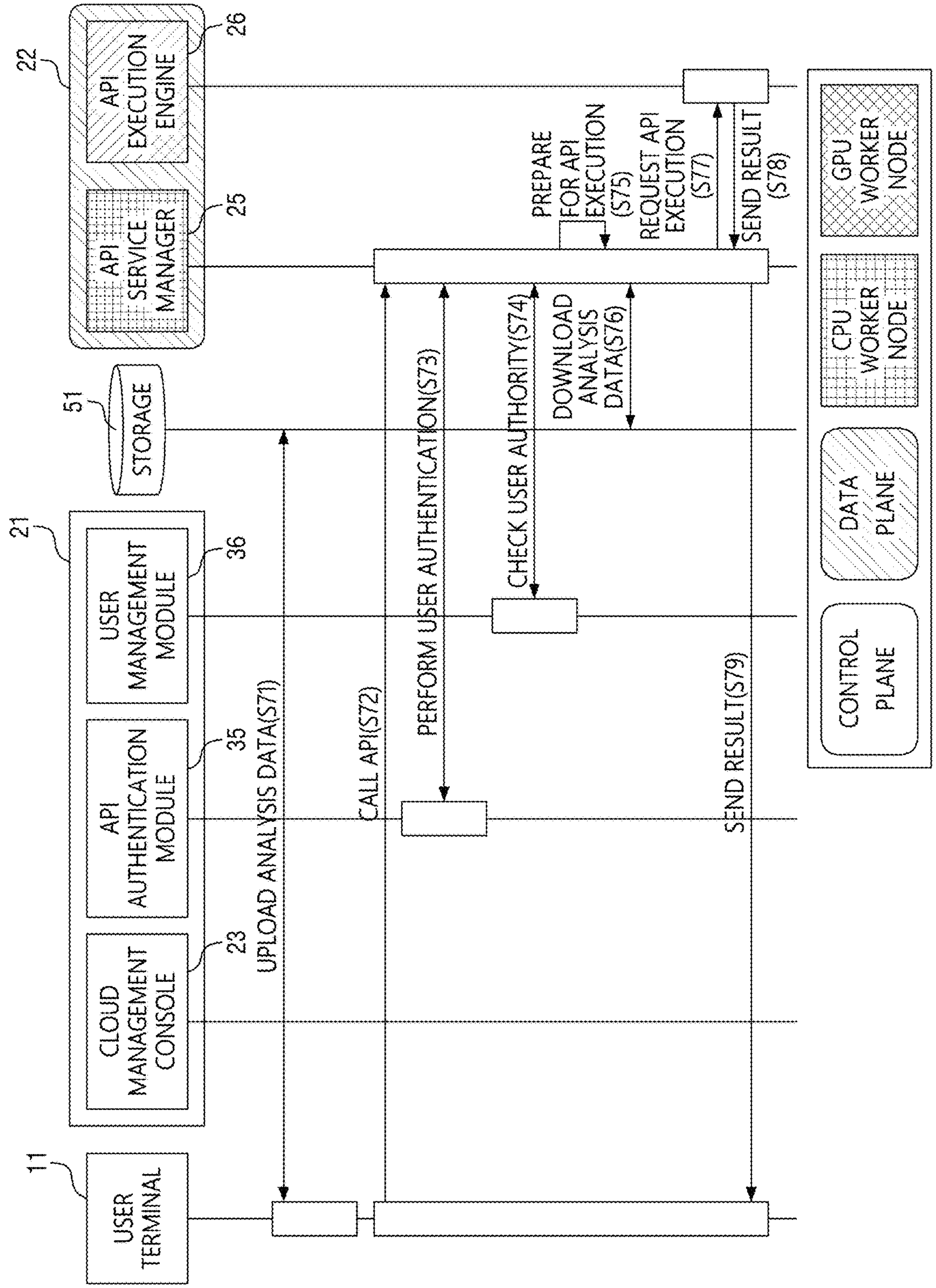
FIGS. 7 and 8 are example flowcharts illustrating a synchronous API call processing process in the cloud-based API service providing system according to the embodiments of the present disclosure.
Figure 8:
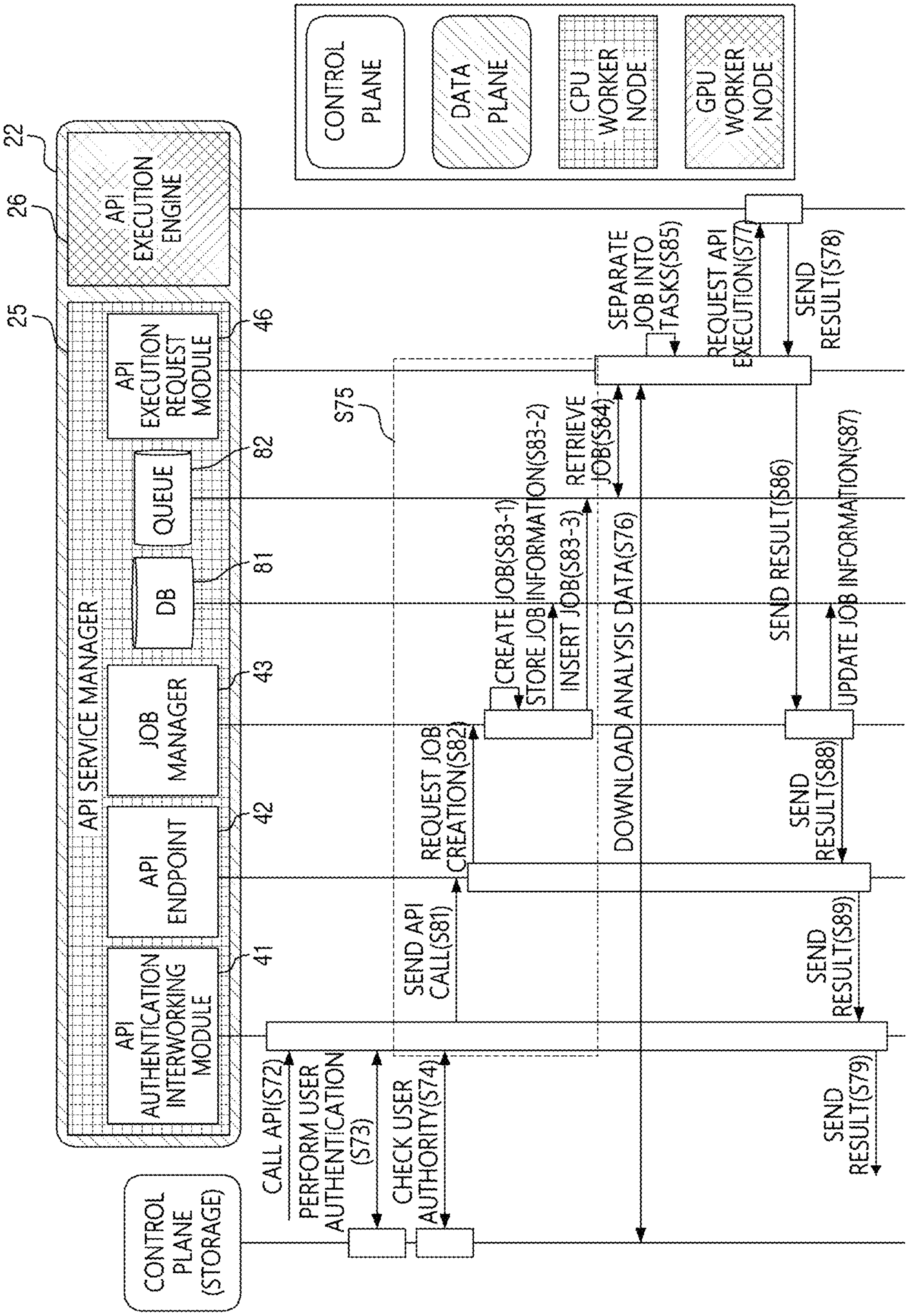

FIGS. 7 and 8 are example flowcharts illustrating a synchronous API call processing process in the service providing system 10 according to the embodiments of the present disclosure. However, this is only an exemplary embodiment for achieving the objectives of the present disclosure, and some operations can be added or deleted as needed. The synchronous API call processing process will now be described with reference to FIGS. 7 and 8.

In operation S71, analysis data may be uploaded to the storage 51. For example, a developer may upload analysis data to the storage 51 (e.g., OBS) before calling an API.

In operation S72, the API service manager 25 belonging to the data plane 22 may receive an API call message (i.e., a call message for a specific API) from a user terminal 11. In other words, the API call message may be sent directly to the API service manager 25 without via the control plane 21. In this case, the response speed to API calls can be improved, and as a result, user satisfaction with API services can be greatly improved.

The API call message may include, for example, a previously issued authentication key and API information (e.g., a URL of the API, parameter values of the API, etc.). However, the scope of the present disclosure is not limited thereto.

In operation S73, the API service manager 25 may perform user authentication by interworking with the API authentication module 35 belonging to the control plane 21. For example, the API service manager 25 may identify a user who called the API using the authentication key included in the API call message. If the authentication key is valid and the user is successfully identified, subsequent operations can continue to be performed.

More specifically, as illustrated in FIG. 8, the API authentication interworking module 41 may receive an API call message and perform user authentication by interworking with the API authentication module 35 (operations S72 and S73). For example, the API authentication interworking module 41 may transmit an authentication key to the API authentication module 35 and receive the result of user authentication (e.g., success, failure, identified user information (e.g., ID), etc.) from the API authentication module 35, but the scope of the present disclosure is not limited thereto. A specific user authentication method can be changed at any time.

In operation S74, the API service manager 25 may check the user's authority by interworking with the user management module 36 belonging to the control plane 21. If the authority checking is performed successfully, subsequent operations can continue to be performed.

More specifically, as illustrated in FIG. 8, the API authentication interworking module 41 may perform authority checking by interworking with the user management module 36 (operation S74). For example, the API authentication interworking module 41 may transmit the user's identification information (e.g., ID) to the user management module 36 and receive the result of authority checking (e.g., success, failure, etc.) from the user management module 36. However, the scope of the present disclosure is not limited thereto, and a specific authority checking method can be changed at any time. In some cases, the API authentication interworking module 41 may further receive the user's storage information (e.g., the user's upload location assigned to the storage 51), project information, etc. from the user management module 36.

In operation S75, the API service manager 25 may prepare for the execution of the called API.

More specifically, as illustrated in FIG. 8, the API call message may be sent to the API endpoint 42 (operation S81). Then, the API endpoint 42 may initiate the preparation for the execution of the called API by requesting job creation for the called API (operation S82). Next, the job manager 43 may create a job for the called API in response to the request (operation S83-1). In addition, the job manager 43 may store information about the created job in a database (DB) 81 and insert the created job into a queue 82 (operations S83-2 and S83-3). Detailed operations of the job manager 43 may be further understood from the description of FIG. 9.

The job information may include, for example, information about the called API (e.g., a URL of the API, parameter values of the API, etc.), user information (e.g., user ID, affiliated project, etc.), storage information (e.g., upload location of analysis data), etc. However, the scope of the present disclosure is not limited thereto.

In operation S76, the API service manager 25 may download the analysis data from the storage 51.

More specifically, as illustrated in FIG. 8, the API execution request module 46 may retrieve the job from the queue 82 (operation S84) and download the analysis data associated with the job from the storage 51 (operation S76).

In some embodiments, the API execution request module 46 may verify the job based on the analysis data. For example, the API execution request module 46 may verify the job based on at least one of a size, extension, and filename of an analysis data file. In a more specific example, the API execution request module 46 may determine the job to be invalid if the size of the analysis data file is equal to or greater than a reference value, if the extension does not meet a predefined rule (e.g., if the extension is not included in a predefined extension list or if the called API is a text analysis API but the extension indicates an image file), or if the filename does not meet a predefined rule (e.g., if its length is equal to or greater than a reference value). The API execution request module 46 may continue to perform subsequent operations if the job is verified to be valid (e.g., if the job is valid, it is separated into tasks).

In addition, in some embodiments, the API execution request module 46 may separate the job into tasks according to a preset criterion (operation S85). For example, the API execution request module 46 may separate the job into a plurality of tasks based on the number of files or pages of the analysis data (e.g., one file or page corresponds to one task) and request the execution of the API on a task-by-task basis (e.g., a request for API execution is repeated on a task-by-task basis). Accordingly, API calls can be processed more quickly.

In operations S77 and S78, the API service manager 25 may request the API execution engine 26 to execute the called API and receive the result of executing the API. The result of executing the API may mean the result of processing the job.

More specifically, as illustrated in FIG. 8, the API execution request module 46 may request the API execution engine 26 to execute the called API (operation S77). At this time, the API execution request module 46 may transmit the downloaded analysis data to the API execution engine 26. Then, the API execution engine 26 may execute the called API for the analysis data. For example, if the called API is an API for a character recognition function, the API execution engine 26 may perform character recognition on the analysis data (e.g., document image). For another example, if the called API is an API for a text analysis function (e.g., sentiment analysis, entity name recognition, etc.), the API execution engine 26 may perform text analysis on the analysis data (e.g., document text). For another example, if the called API is an API for an image analysis function (e.g., object detection, etc.), the API execution engine 26 may perform image analysis on the analysis data (e.g., image).

If the job is separated into tasks, the API execution request module 46 may request the execution of the called API on a task-by-task basis (operation S77). For example, if the analysis data is a document image consisting of multiple pages, each being created as one task, the API execution request module 46 may request the execution of the API for a first page of the document image and request the execution of the API again for a second page.

In some cases, the API execution request module 46 may verify the tasks and request the execution of the API only for the verified tasks. Any method can be used to verify the tasks.

In operation S79, the API service manager 25 may send the result of executing the called API (i.e., the result of processing the job) to the user terminal 11. In some cases, the API service manager 25 may upload the result of executing the API to the storage 51 and send an execution completion message to the user terminal 11.

More specifically, as illustrated in FIG. 8, the job manager 43 may receive the result of executing the called API from the API execution request module 46 and update the job information (operations S86 and S87). For example, the job manager 43 may store the result of executing the called API in the DB 81 and update the job processing status to a completed status. Next, the job manager 43 may send the result of executing the called API to the user terminal 11 through the API endpoint 42 and the API authentication interworking module 41 (operations S88, S89 and S79).

Detailed operations of the job manager 43 will now be additionally described with reference to FIG. 9.

Figure 9:
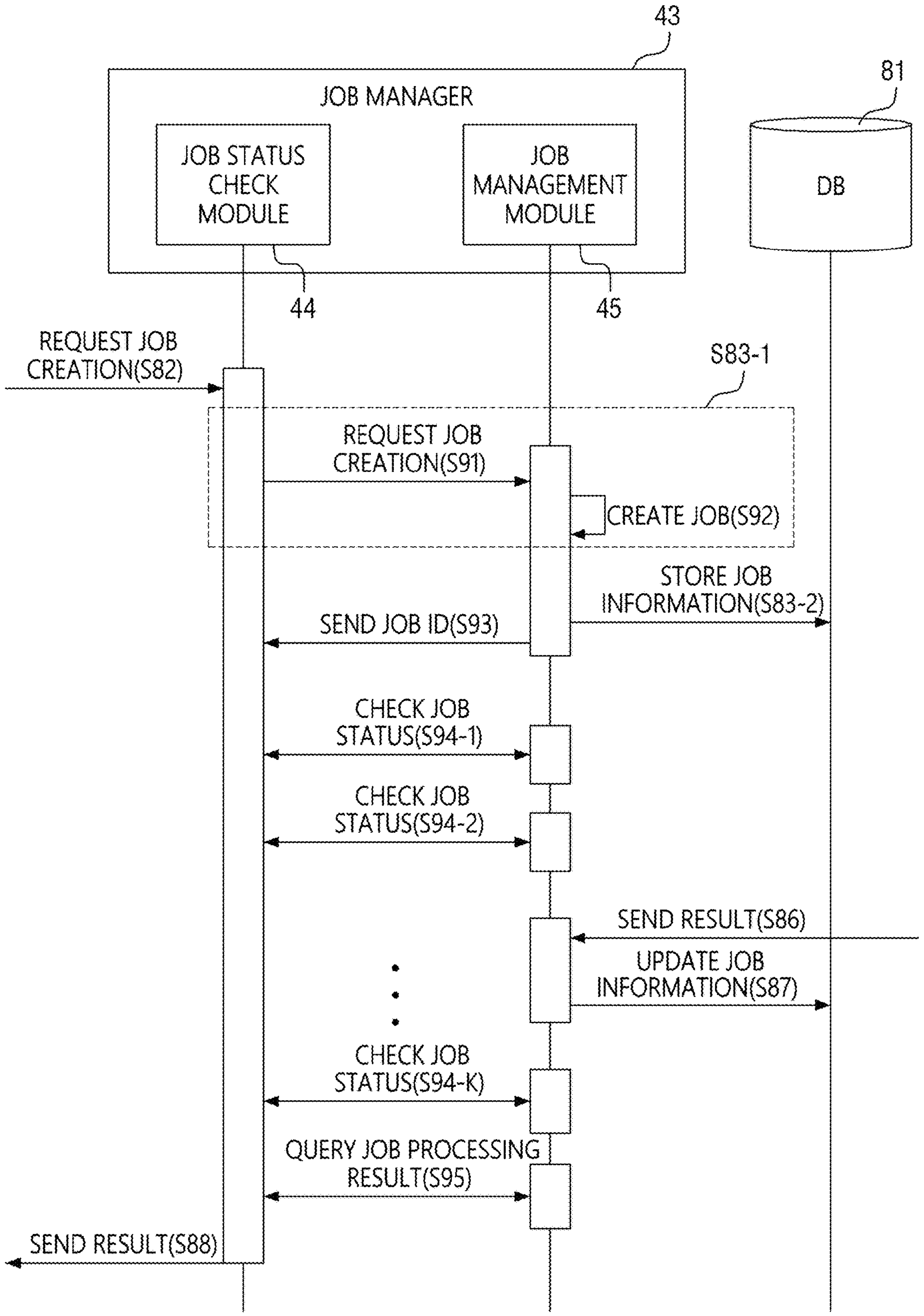
FIG. 9 is an example flowchart illustrating a job status checking process in the cloud-based API service providing system according to the embodiments of the present disclosure.

As illustrated in FIG. 9, the job manager 43 may be configured to include the job status check module 44 and the job management module. The job management module 45 may create a job for a called API and issue an ID of the job (operations S91 and S92). In addition, the job management module 45 may send the ID of the job to the job status check module 44 (operation S93).

The job status check module 44 may check the status of the job being processed using a polling method (operations S94-1 through S94-K). For example, the job status check module 44 may periodically check the processing status of the job through the job management module 45. In other words, the job status check module 44 may transmit the ID of the job to the job management module 45 and request a query of the processing status of the job. Then, the job management module 45 may query the processing status of the job in the DB 81 using the ID of the job and send the query result to the job status check module 44.

When the job management module 45 updates the processing status of the job to the completed status, the processing status of the job may be checked as completed (operations S87 and S94-K). Then, the job status check module 44 may obtain the result of executing the called API (i.e., the result of processing the job) by querying the database 81 using the ID of the job through the job management module 45 (operation S95). The job status check module 44 may send the query result to the user terminal 11 through the API endpoint 42 (operations S88, S89 and S79).

So far, the synchronous API processing process in the service providing system 10 according to the embodiments of the present disclosure has been described with reference to FIGS. 7 through 9. According to the above description, an API call message can be sent to the API service manager 25 belonging to the data plane 22 without via the control plane 21. In this case, even if API call-related traffic (load) increases, there is no response delay for all functions of the system, and as a result, service quality and user satisfaction can be improved. Furthermore, the problem of response delay to API calls can be easily solved by increasing the resources of the data plane 22 responsible for processing API calls.

In addition, since various APIs for AI-based data analysis functions (e.g., character recognition, text analysis, image analysis, etc.), which are difficult for general users to develop, are integrated and provided, user satisfaction with API services can be further improved.

An asynchronous API processing process according to embodiments of the present disclosure will now be described with reference to FIGS. 10 through 12. For clarity of the present disclosure, a description of contents overlapping the synchronous API processing process described above will be omitted.

Figure 10:
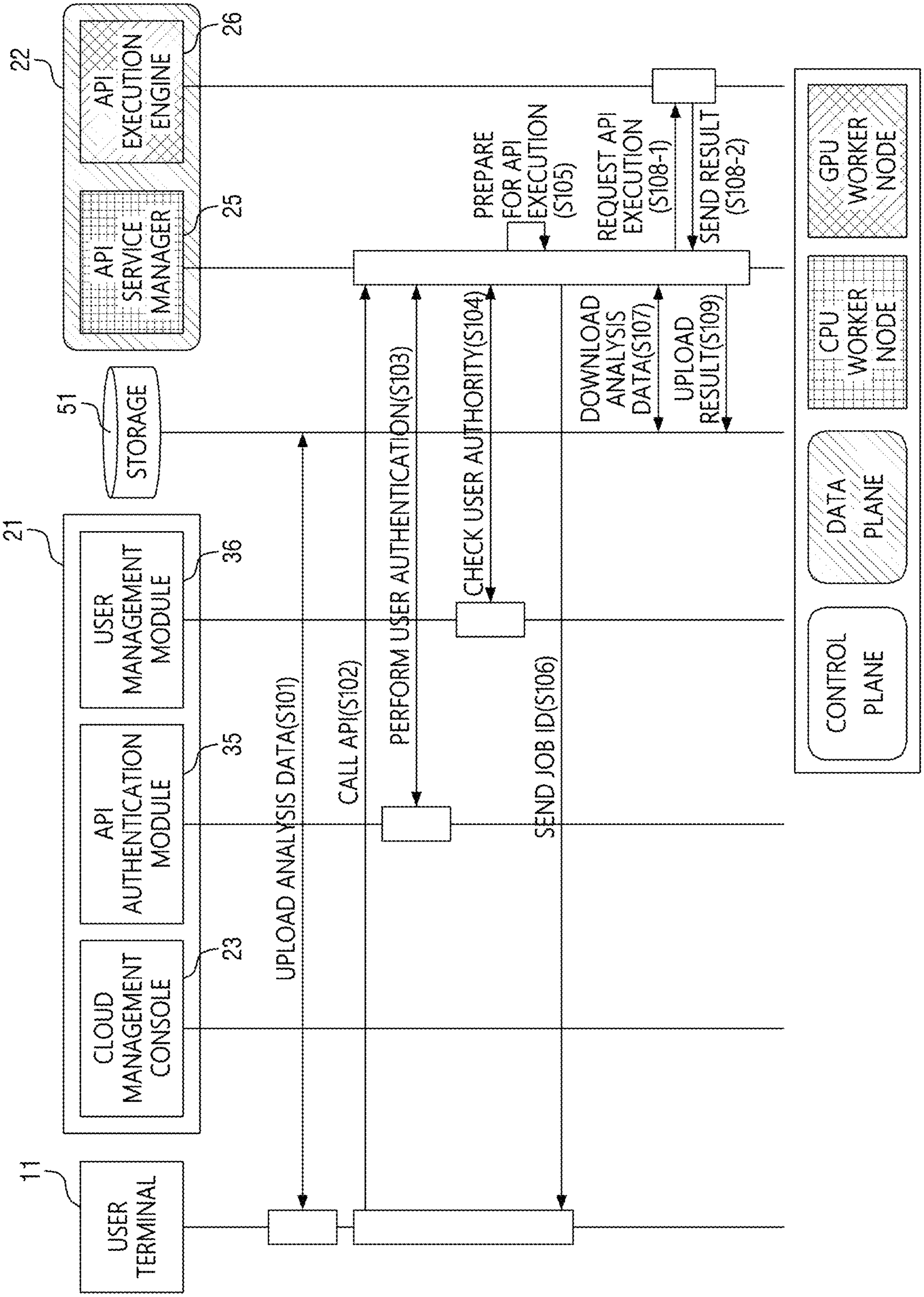
FIGS. 10 and 11 are example flowcharts illustrating an asynchronous API call processing process in the cloud-based API service providing system according to the embodiments of the present disclosure.
Figure 11:
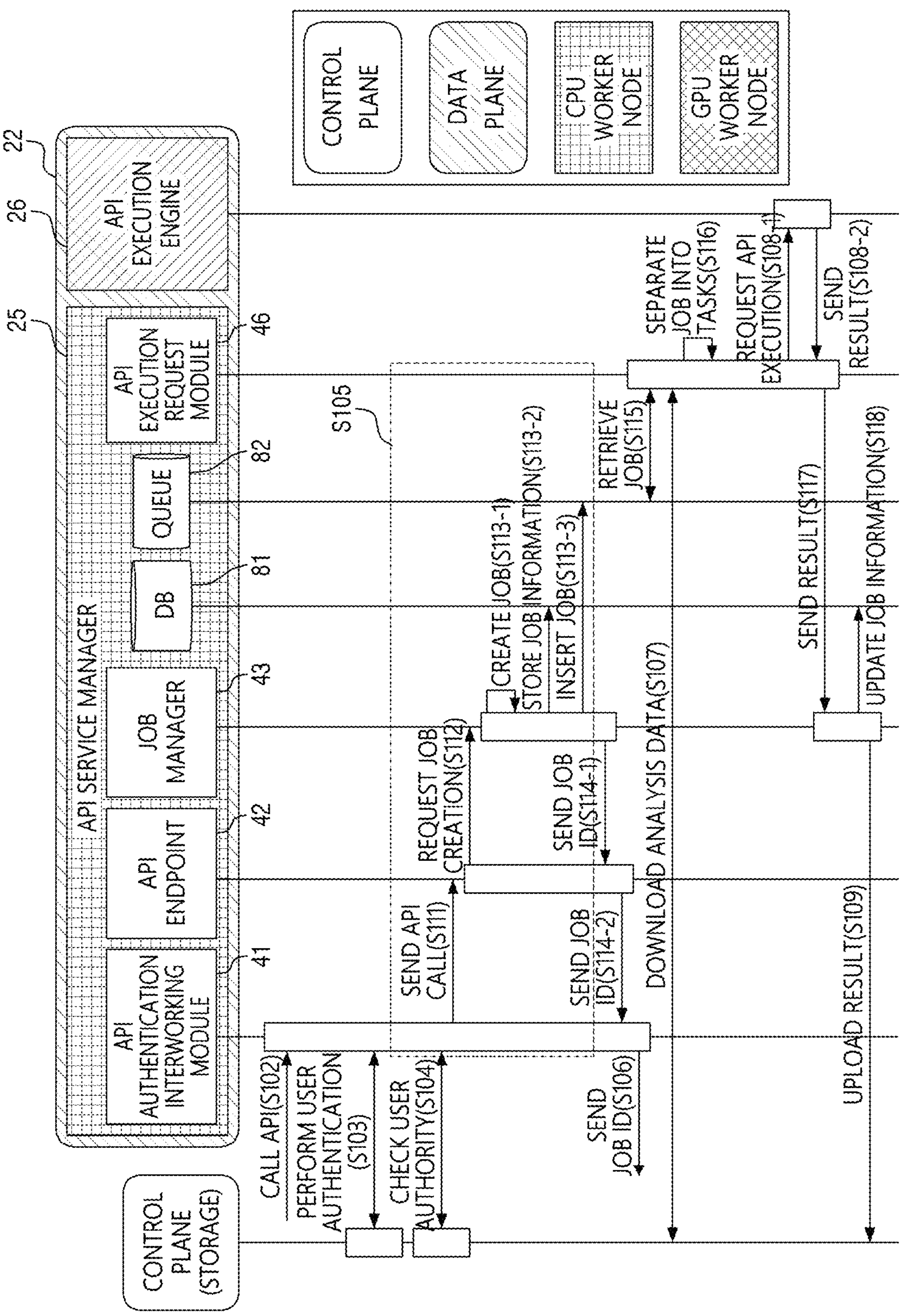

FIGS. 10 and 11 are example flowcharts illustrating an asynchronous API call processing process in the service providing system 10 according to the embodiments of the present disclosure. However, this is only an exemplary embodiment for achieving the objectives of the present disclosure, and some operations can be added or deleted as needed. The asynchronous API call processing process will now be described with reference to FIGS. 10 and 11.

In operation S101, analysis data may be uploaded to the storage 51.

In operation S102, the API service manager 25 may receive an API call message from a user terminal 11.

In operation S103, the API service manager 25 may perform user authentication for a called API by interworking with the API authentication module 35.

In operation S104, the API service manager 25 may check a user's authority for the called API by interworking with the user management module 35.

In operations S105 and S106, the API service manager 25 may prepare for the execution of the called API and send a job ID to the user terminal 11 before the execution of the called API starts (or is completed).

More specifically, as illustrated in FIG. 11, the job manager 43 may create a job for the called API in response to a job creation request from the API endpoint 42 and issue an ID of the job (operations S111, S112 and S113-1). In addition, the job manager 43 may store information about the created job in the DB 81 and insert the job into the queue 82. Next, the job manager 43 may send the ID of the job to the user terminal 11 through the API endpoint 42 and the API authentication interworking module 41 before the job is processed (operations S114-1, S114-2 and S106). The ID of the job may be used by the user terminal 11 to query the job information (e.g., the job processing status or the job processing result). This can be understood from the description of FIG. 12.

In operation S107, API service manager 25 may download the analysis data from the storage 51.

More specifically, as illustrated in FIG. 11, the API execution request module 46 may retrieve the job from the queue 82 (operation S115) and download the analysis data associated with the job from the storage 51 (operation S107).

In operations S108-1 and S108-2, the API service manager 25 may execute the called API through the API execution engine 26.

For example, as illustrated in FIG. 11, the API execution request module 46 may separate the retrieved job into tasks (operation S116) and request the execution of an API (i.e., the called API) for the job on a task-by-task basis (operation S108). Next, the API execution request module 46 may receive the result of executing the called API from the API execution engine 26 and send the execution result to the job manager 43 (operations S108-2 and S117). Then, the job manager 43 may store the result of executing the called API in the DB 81 and update the processing status of the job to a completed status (operation S118).

In operation S109, the API service manager 25 may upload the result of executing the called API to the storage 51. This upload service may be provided for an asynchronous API and may be provided selectively according to the user's choice or may be provided by default.

In some cases, the API service manager 25 may upload the result of executing the called API to the storage 51 and then send an execution completion message to the user terminal 11.

A job information query process using a job ID will now be additionally described with reference to FIG. 12.

Figure 12:
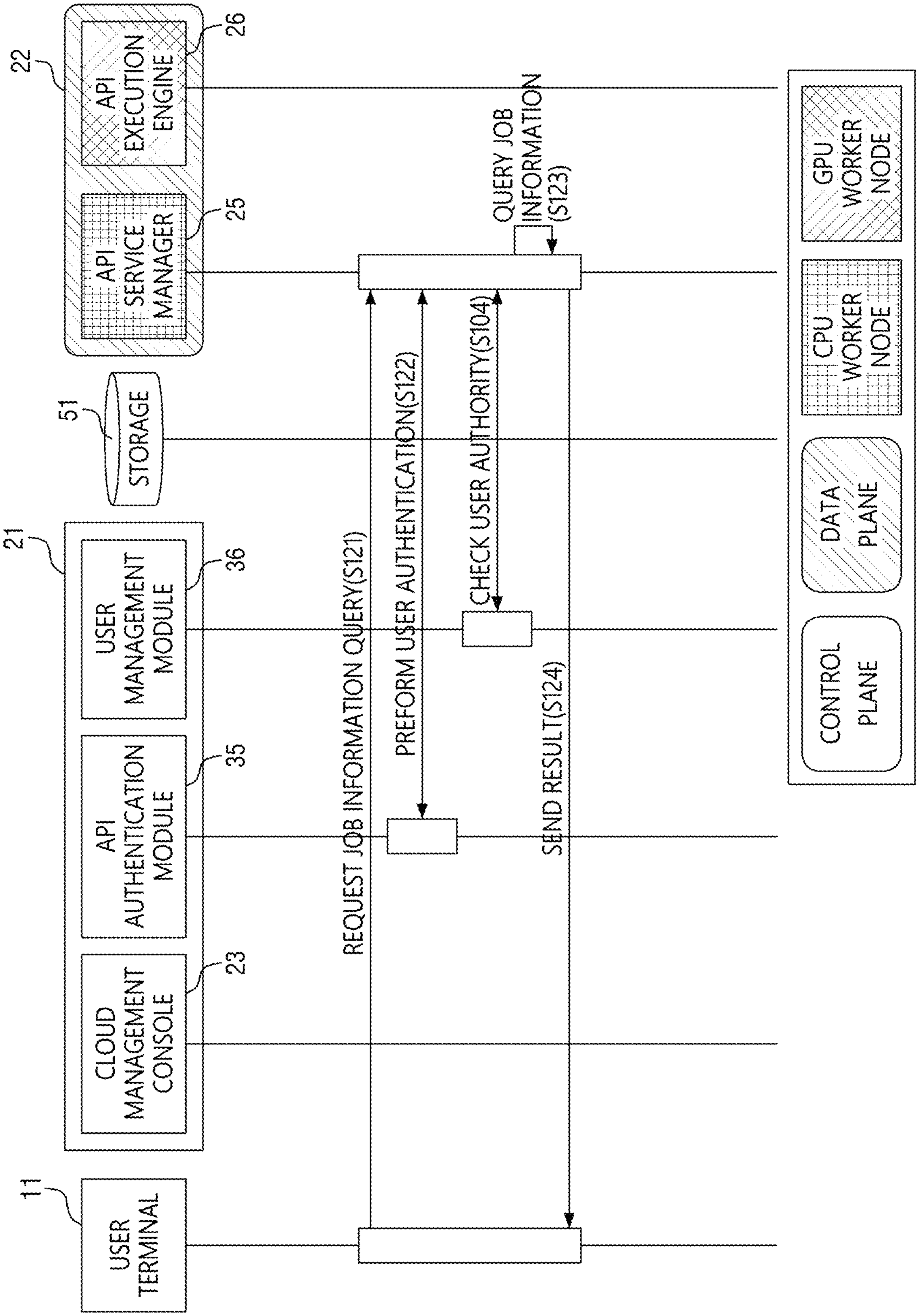
FIG. 12 is an example flowchart illustrating a job information query process in the cloud-based API service providing system according to the embodiments of the present disclosure.

As illustrated in FIG. 12, a user terminal 11 may query job information (e.g., processing status, processing result, etc.) using a received job ID.

Specifically, in operation S121, the API service manager 25 may receive a query request (i.e., a request message) including a job ID and an authentication key of a specific API (i.e., an asynchronous API) from the user terminal 11. For example, the API authentication interworking module 41 may receive the query request from the user terminal 11.

In operation S122, the API service manager 25 may perform user authentication by interworking with the API authentication module 35. For example, the API authentication interworking module 41 may perform user (i.e., query requestor) authentication based on the authentication key through the API authentication module 35. If the authentication is performed successfully, subsequent operations can continue to be performed.

In operations S123 and S124, the API service manager 25 may query the DB 81 using the job ID and send the query result to the user terminal 11. The query result may be, but is not limited to, for example, job processing status information, job processing result (i.e., API execution result), etc.

More specifically, the API authentication interworking module 41 may send a query request message to the job manager 43, and the job manager 43 may query the DB 81 using a job ID included in the query request message. In addition, the job manager 43 may send the query result to the user terminal 11 through the API authentication interworking module 41.

So far, the asynchronous API call processing process in the service providing system 10 according to the embodiments of the present disclosure has been described with reference to FIGS. 10 through 12. According to the above description, since an asynchronous API is provided to a user in addition to a synchronous API, user satisfaction with API services can be further improved.

An API demo service providing process in the service providing system 10 will now be described with reference to FIG. 13.

Figure 13:
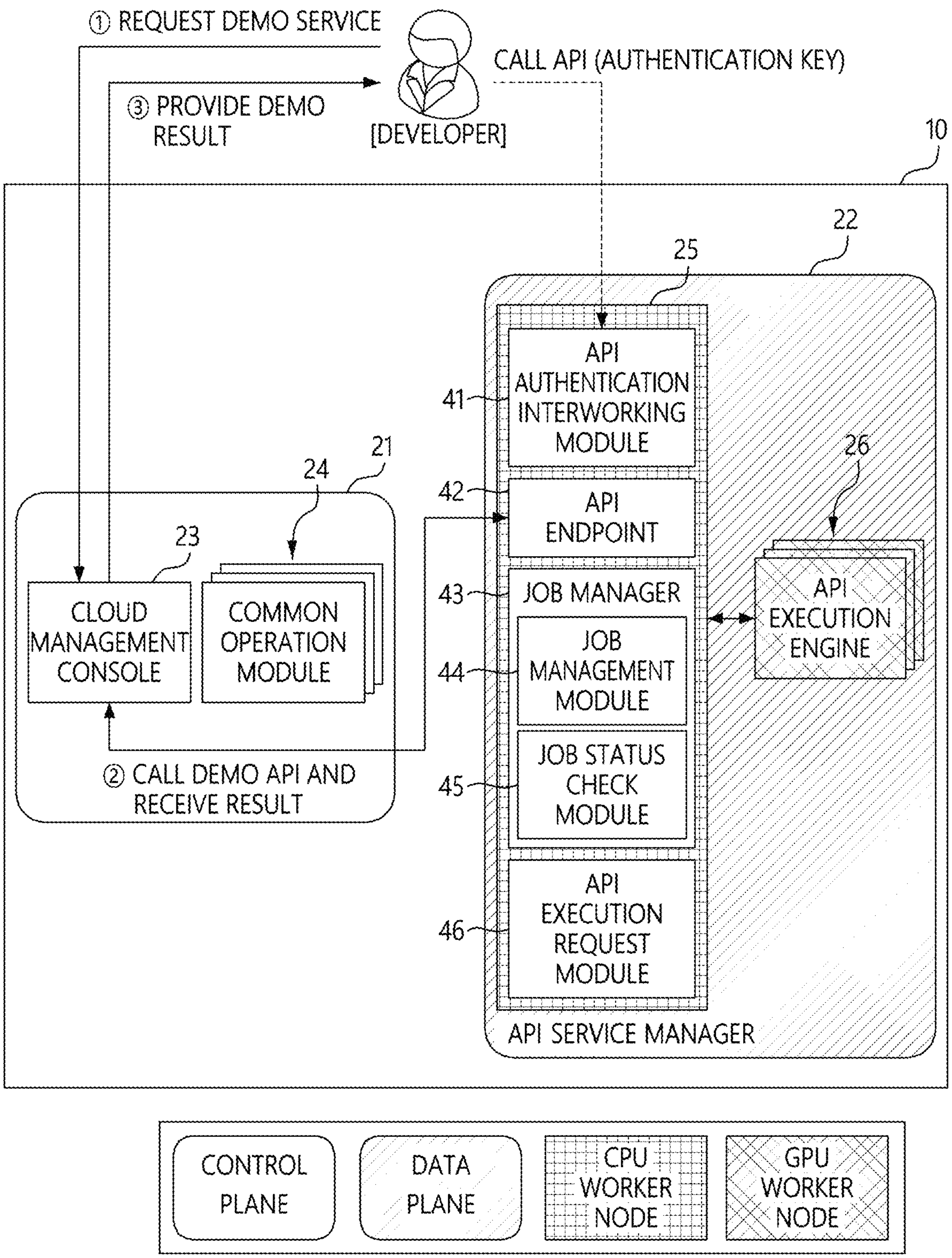
FIG. 13 illustrates the overall flow of an API demo service providing process in the cloud-based API service providing system according to the embodiments of the present disclosure.

FIG. 13 illustrates the overall flow of an API demo service providing process. FIG. 13 assumes that a user is a developer.

As illustrated in FIG. 13, the cloud management console 23 may receive a demo service request from a developer (i.e., the developer's terminal) (see ①). More specifically, the demo management console 34 may receive a demo service request including a demo API selected by the developer (?) and analysis data.

Next, the cloud management console 23 may transmit a call message for the demo API to the API service manager 25, and thus the demo API may be executed (see ②). More specifically, the demo management console 34 may transmit a call message for the demo API to the API endpoint 42 (i.e., request the execution of the demo API) and obtain the result of executing the demo API. Here, it can be understood that the demo management console 34 transmits the demo API call message to the API endpoint 42 because procedures such as user authentication and authority checking are omitted for the demo API. That is, the API service manager 25 may be configured not to require authentication information for an API requested (called) by the demo management console 34 (general API call messages are sent to the API authentication interworking module 41). Details of the API execution process may be understood from the description of FIGS. 5 through 12.

Next, the cloud management console 23 may provide the result of executing the demo API to the developer. That is, the demo management console 34 may provide the result of executing the demo API to the developer (e.g., the execution result is displayed on the screen of the developer's terminal).

Although not clearly illustrated in FIG. 13, when an administrator (i.e., a development manager) applies for a specific API (or API product), a demo service may be provided for the requested API (or API product).

So far, the API demo service providing process in the service providing system 10 has been described with reference to FIG. 13. According to the above description, since a demo service is provided for various APIs, a user's authority to select an API service can be guaranteed, and thus user satisfaction can be further improved.

Hereinafter, an example computing device 140 that can implement the service providing system 10 described above will be described with reference to FIG. 14.

FIG. 14 illustrates the example hardware configuration of a computing device 140.

As illustrated in FIG. 14, the computing device 140 may include one or more processors 141, a bus 143, a communication interface 144, a memory 142 which loads a computer program 146 to be executed by the processors 141, and storage 145 which stores the computer program 146. In FIG. 14, only the components related to embodiments of the present disclosure are illustrated. Therefore, it will be understood by those of ordinary skill in the art to which the present disclosure pertains that other general-purpose components can be included in addition to the components illustrated in FIG. 14. That is, the computing device 140 may further include various components other than the components illustrated in FIG. 14. In addition, in some cases, some of the components illustrated in FIG. 14 may be omitted from the computing device 140. Each component of the computing device 140 will now be described.

The processors 141 may control the overall operation of each component of the computing device 140. The processors 141 may include at least one of a CPU, a microprocessor unit (MPU), a micro-controller unit (MCU), a GPU, a neural processing unit (NPU), and any form of processor well known in the art to which the present disclosure pertains. In addition, the processors 141 may perform an operation on at least one application or program for executing operations/methods according to embodiments of the present disclosure. The computing device 220 may include one or more processors.

Next, the memory 142 may store various data, commands and/or information. The memory 142 may load the computer program 146 from the storage 145 in order to execute operations/methods according to embodiments of the present disclosure. The memory 142 may be implemented as a volatile memory such as a random access memory (RAM), but the technical scope of the present disclosure is not limited thereto.

Next, the bus 143 may provide a communication function between the components of the computing device 140. The bus 143 may be implemented as various forms of buses such as an address bus, a data bus, and a control bus.

Next, the communication interface 144 may support wired and wireless Internet communication of the computing device 140. In addition, the communication interface 144 may support various communication methods other than Internet communication. To this end, the communication interface 144 may include a communication module well known in the art to which the present disclosure pertains.

Next, the storage 145 may non-temporarily store one or more programs 146. The storage 145 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 146 may include instructions for controlling the processors 141 to perform operations/methods according to various embodiments of the present disclosure when the computer program 146 is loaded into the memory 142. That is, the processors 141 may perform the operations/methods according to the various embodiments of the present disclosure by executing the instructions loaded into the memory 142.

For example, the computer program 146 may include instructions for performing an operation of receiving a call message for a specific API from a user's terminal 11 without via a control plane to which a cloud management console 23 belongs, an operation of authenticating the user using authentication information in the call message, an operation of obtaining the result of executing the specific API through an API execution engine 26 if the authentication is successfully performed, and an operation of providing the obtained execution result to the user's terminal 11.

In another example, the computer program 146 may include instructions for performing at least some of the operations/steps described with reference to FIGS. 1 through 13.

In the above examples, the service providing system 10 according to the embodiments of the present disclosure may be implemented through the computing device 140.

In some embodiments, the computing device 140 illustrated in FIG. 14 may be a virtual machine implemented based on cloud technology. For example, the computing device 140 may be a virtual machine operating on one or more physical servers included in a server farm. In this case, at least some of the processors 141, the memory 142, and the storage 145 illustrated in FIG. 14 may be virtual hardware, and the communication interface 144 may also be a virtualized networking element such as a virtual switch.

So far, an example computing device 140 that can implement the service providing system 10 according to the embodiments of the present disclosure has been described with reference to FIG. 14.

So far, a variety of embodiments of the present disclosure and the effects according to embodiments thereof have been mentioned with reference to FIGS. 1 to 14. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A cloud-based application programming interface (API) service providing system comprising:

one or more processors and a memory storing instructions that, when executed by the one or more processors, configure the one or more processors to implement;

a cloud management console configured to issue authentication information for a requested API among a plurality of APIs;

an API service manager configured to receive a call message for a specific API, which comprises authentication information, from a user's terminal, to perform authentication using the authentication information in the call message, and to request the execution of the specific API based on the authentication result; and an API execution engine configured to generate the result of executing the specific API in response to a request from the API service manager, wherein the cloud management console belongs to a control plane implemented on a first network, the API service manager belongs to a data plane implemented on a second network different from the first network having a larger bandwidth, and the call message is received by the API service manager directly on the second network without the call m age passing through the control plane.

2. The system of claim 1, wherein the APIs comprise APIs for artificial intelligence (AI)-based character recognition, AI-based text analysis, and AI-based image analysis functions and wherein the specific API is an API for a data analysis function, and the API execution engine runs on a graphic processing unit (GPU)-based worker node and wherein the specific API is an API for a data analysis function, and the API service manager downloads analysis data from a storage and transmits the analysis data to the API execution engine.

3. The system of claim 2, wherein the system is configured to perform auto-scaling to increase or decrease a number of the GPU-based worker nodes based on resource usage of the GPU-based worker nodes.

4. The system of claim 1, wherein the one or more processors are further configured to implement an API authentication module belonging to the control plane, wherein the API service manager performs the authentication by interworking with the API authentication module.

5. The system of claim 1, wherein the one or more processors are further configured to implement a user management module belonging to the control plane, wherein the API service manager checks the user's authority to use the specific API by interworking with the user management module and requests the execution of the specific API based further on the checking result.

6. The system of claim 1, wherein the API service manager comprises:

an API authentication interworking module performing the authentication by interworking with the control plane;

a job manager creating a job for the specific API based on the call message and inserting the job into a queue; and an API execution request module retrieving the job from the queue and requesting the API execution engine to execute the specific API.

7. The system of claim 6, wherein the job manager comprises:

a job management module creating a job for the specific API and issuing an ID of the job; and a job status check module checking a processing status of the job using a polling method by using the ID of the job.

8. The system of claim 7, wherein the job management module receives the result of executing the specific API from the API execution request module, stores the execution result in a database and updates the processing status of the job to a completed status, and the job status check module obtains the execution result from the database if the processing status of the job is the completed status and sends the execution result to the user's terminal.

9. The system of claim 1, wherein the API service manager comprises:

an API authentication interworking module performing the authentication by interworking with the control plane;

a job manager creating a job for the specific API based on the call message; and an API execution request module separating the job into tasks based on a preset criterion and requesting the API execution engine to execute the specific API on a task-by-task basis.

10. The system of claim 9, wherein the specific API is an API for a data analysis function, and the API execution request module verifies the job based on at least one of a size, extension and filename of an analysis data file and processes the job by separating the job into tasks if the job is valid.

11. The system of claim 9, wherein the specific API is an API for a data analysis function, and the API execution request module separates the job into the tasks based on the number of files or pages of analysis data.

12. The system of claim 1, wherein the API service manager comprises:

an API authentication interworking module performing the authentication by interworking with the control plane;

a job manager creating a job for the specific API based on the call message; and an API execution request module requesting the API execution engine to execute the specific API in order to process the job, wherein if the specific API is an asynchronous API, the job manager sends an ID of the job to the user's terminal before the job is processed.

13. The system of claim 12, wherein the job manager receives the result of executing the specific API from the API execution request module and uploads the execution result to storage accessible by the user's terminal.

14. The system of claim 12, wherein the API authentication interworking module receives a query request comprising the ID of the job and the authentication information for the specific API, authenticates a requestor using the authentication information in the query request and provides a query result for the ID of the job to the requestor if the requestor is authenticated, and the query result comprises processing status information of the job or the result of executing the specific API.

15. The system of claim 1, wherein the cloud management console comprises a demo management console which provides, on a trial basis, the result of executing an API selected by a specific user from the APIs, the demo management console obtains the result of executing the selected API by requesting the API service manager for the result of executing, and the API service manager is configured not to require authentication information for an API requested by the demo management console.

16. The system of claim 1, wherein the API service manager runs on a Central Processing Unit (CPU) worker node, and the API execution engine runs on a Graphic Processing Unit (GPU) worker node.

17. The system of claim 1, wherein the call message comprises storage information indicating an upload location of analysis data in a storage, and wherein the API service manager is configured to download the analysis data from the storage based on the storage information and transmit the downloaded analysis data to the API execution engine.

18. A cloud-based API service providing method performed by at least one computing device and comprising:

receiving a call message for a specific API from a user's terminal without via a control plane to which a cloud management console belongs;

performing authentication of the user using authentication information in the call message by interworking with an API authentication module belonging to the control plane;

obtaining the result of executing the specific API through an API execution engine if the authentication is successfully performed; and providing the execution result to the user's terminal, wherein the call message comprises the authentication information, the authentication information is issued by the cloud management console.

19. The method of claim 18, wherein the cloud management console issues authentication information for a plurality of APIs comprising the specific API, and the APIs comprise APIs for AI-based character recognition, AI-based text analysis and AI-based image analysis functions and wherein the specific API is an API for a data analysis function, and the API execution engine runs on a GPU-based worker node.

20. A non-transitory computer-readable recording medium storing a computer program coupled to a computing device that, when the computer program is executed by the computing device, causes the computing device to execute:

receiving a call message for a specific API from a user's terminal without via a control plane to which a cloud management console belongs;

performing authentication of the user using authentication information in the call message by interworking with an API authentication module belonging to the control plane;

obtaining the result of executing the specific API through an API execution engine if the authentication is successfully performed; and providing the execution result to the user's terminal, wherein the call message comprises the authentication information, the authentication information is issued by the cloud management console.

* * * * *